J. H. ANTHON AND C. H. FELDMANN.
AUTO SPEED SIGNALING DEVICE.
APPLICATION FILED JAN. 17, 1917.
1,318,638. Patented Oct. 14, 1919.
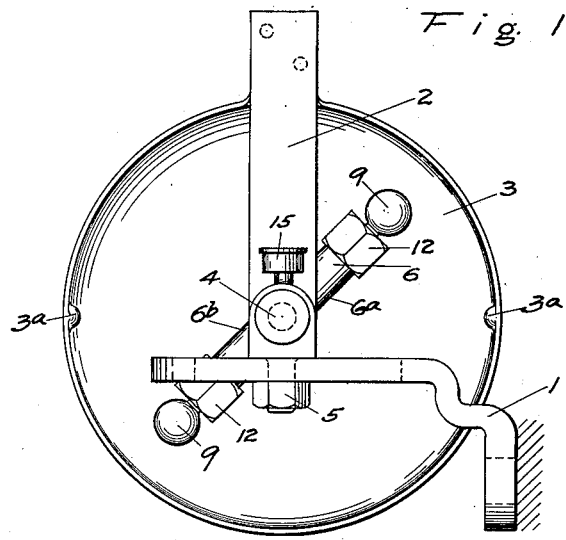
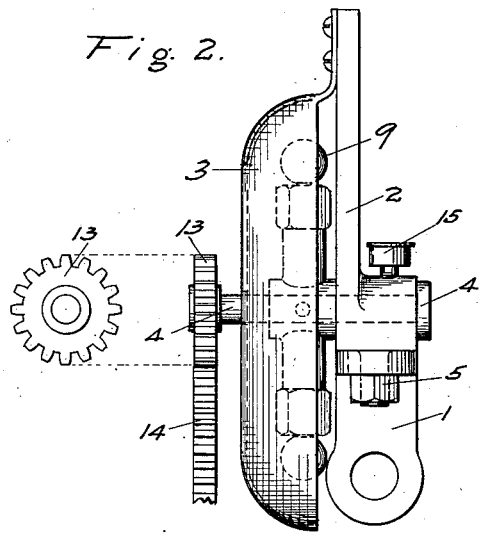
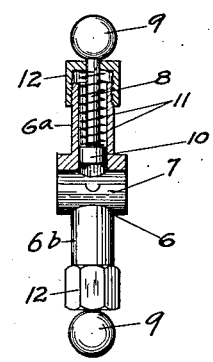

UNITED STATES PATENT OFFICE.

JOHN H. ANTHON AND CHARLES H. FELDMANN, OF PORTLAND, OREGON.

AUTO SPEED-SIGNALING DEVICE.

1,318,638. Specification of Letters Patent. Patented Oct. 14, 1919.

Application filed January 17, 1917. Serial No. 142,862.

*To all whom it may concern:*

Be it known that we, JOHN H. ANTHON and CHARLES H. FELDMANN, citizens of the United States, residing in the city of Portland, county of Multnomah, and State of Oregon, have invented certain new and useful Improvements in Auto Speed-Signaling Devices, of which the following is a specification.

Our invention relates to auto speed signaling devices, and more particularly to a device adapted to be mounted upon an automobile and driven thereby, while the automobile is running, for the purpose of indicating excessive speed.

One of the principal objects of our invention is to provide a simple and practical device which can be mounted upon automobiles without any reconstruction of parts, and which will operate automatically under excessive speed of the automobile to give a warning signal of said excess speed.

Another object of our invention is to provide a device which can be regulated and set for different speeds, as may be permitted under the various traffic laws in different places.

In order to clearly explain our invention we have illustrated one practical embodiment thereof on the accompanying sheet of drawings, which we will now describe.

Figure 1 is a rear side elevation of a device embodying our invention;

Fig. 2 is an edge view thereof; and

Fig. 3 is an edge view of a detail, partly in section, to show the construction thereof.

Referring now more in detail to the drawings, our invention comprises a supporting bracket 1, which may be of any suitable form and adapted to be secured to a fixed part of the automobile adjacent one of the wheels. Adjustably secured to said bracket 1, is an upright supporting member 2, constituting a combination supporting member for supporting a bell 3, and a bearing member to receive a spindle 4, said member 2, being adjustably secured in a slot in said bracket 1, by means of a nut 5. Mounted upon said spindle 4, within the bell, is a revolving element 6, comprising a hub 7, adapted to be secured to the spindle 4, and provided with oppositely disposed cylindrical members 6ª and 6ᵇ, each having mounted therein a plunger-like member 8, provided on its outer end with a ball, or knob 9, and on its inner end with a collar 10. A coiled spring 11, is mounted on each of said plungers within said cylindrical members, and bears at its inner end upon the collar 10, and at its outer end against an adjustable nut 12, screwed on to the outer end of the cylinders 6ª and 6ᵇ. Said nuts 12, can be turned to regulate the tension of the springs 11. Any means for securing said nuts against being turned after the device has once been set may be used.

The spindle 4, projects through the bell 3, and is provided with a pinion 13, adapted to be put in mesh with a gear, as 14, mounted on the wheel of the automobile. Preferably the same gear which is used for driving the speedometer is used for driving the pinion 13.

An oil, or grease cup 15, is mounted on the supporting member 2, for oiling the spindle 4. The bell 3, is preferably provided on its inner periphery with lug-like members 3ª, adapted to be struck by the balls, or knobs, 9—9, when the speed of the revolving member 6, is such that the plungers 8, are thrown outwardly by centrifugal force sufficiently for the balls 9, to strike said lugs 3ª, and thus ring the bell 3.

In operation, our device is preferably mounted on the part of a frame of an automobile adjacent a front wheel so that the pinion 13, can be put in mesh with the gear mounted on said front wheel, which drives the speedometer. This connection drives the revolving member 6. As the speed of the automobile increases, the speed of the revolving member also increases, and if the speed becomes sufficient so that centrifugal force acting on the plungers 8—8, overcomes the tension of the springs 11—11, said plungers are thrown outwardly sufficiently for their balls 9—9, to strike the knobs 3ª—3ª of the bell 3, thus sounding an alarm and giving warning that an excessive speed has been reached.

We are aware that changes in details can be made in our invention as here embodied for purposes of illustration, and we do not, therefore, limit the invention to these details, except as we may be limited by the hereto appended claim.

We claim:

A speed signaling device of the character referred to comprising a supporting member, a bell secured to said supporting member with its open side adjacent thereto, said bell having a central opening, a spindle having a bearing at one end in said support with its other end projecting freely through the opening in said bell, a revolving element secured to said spindle, within said bell, and comprising a hub, cylindrical members, and spring-controlled, bell-engaging elements, said bell being provided on its inner side with lug-like portions adapted to be struck by said bell-engaging elements under speed, and driving means on the free end of said spindle, outside of said bell, for driving said spindle and said revolving element, substantially as described.

Signed at Portland, Multnomah county, Oregon, this 10th day of January, 1917.

JOHN H. ANTHON.
CHARLES H. FELDMANN.

In presence of—
I. M. GRIFFIN,
J. C. STRENG.